(No Model.)

G. H. MERRICK.
BUSHING FOR BARRELS.

No. 520,240. Patented May 22, 1894.

WITNESSES
Chas. E. Thomas
J. Edw. Fowler

INVENTOR
George H. Merrick,
by Dewey & Co.
Attorneys

UNITED STATES PATENT OFFICE.

GEORGE H. MERRICK, OF SAN FRANCISCO, ASSIGNOR TO W. FRANK PIERCE, OF OAKLAND, CALIFORNIA.

BUSHING FOR BARRELS.

SPECIFICATION forming part of Letters Patent No. 520,240, dated May 22, 1894.

Application filed December 1, 1893. Serial No. 492,528. (No model.)

*To all whom it may concern:*

Be it known that I, GEORGE H. MERRICK, a citizen of the United States, residing in the city and county of San Francisco, State of California, have invented certain new and useful Improvements in Bushings for Barrels; and I hereby declare the following to be a full, clear, and exact description of the same.

My invention relates to certain improvements in bushings for barrels, casks, and like devices, and a longitudinally movable valve operated by a faucet to open and close upon turning the faucet axially, and to remain locked when the faucet is removed; and it consists of the constructions and combinations of parts which I shall hereinafter fully describe and claim.

Figure 1:
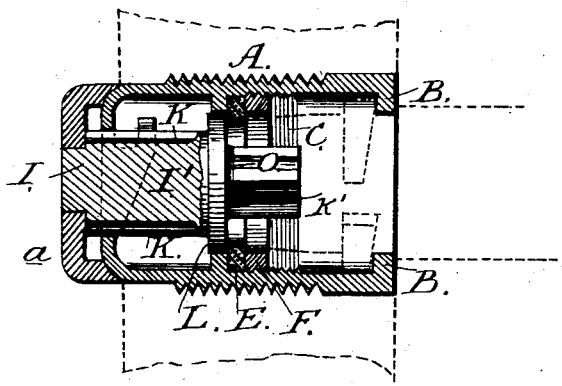
Figure 2:
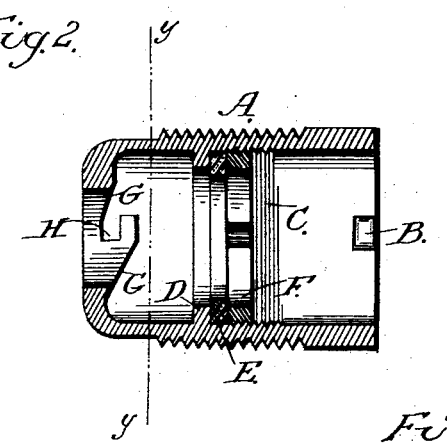
Figure 3:
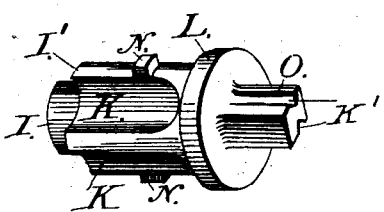
Figure 4:
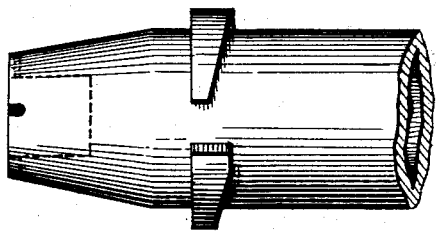
Figure 5:
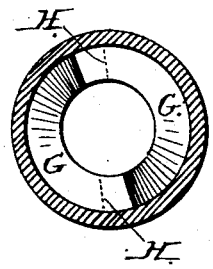

In the accompanying drawings:—Figure 1 represents a longitudinal sectional view of a bushing and valve embodying my invention. Fig. 2 is a similar view with the valve removed. Fig. 3 is a perspective view of the valve detached from the bushing. Fig. 4 represents the inner end of a faucet barrel adapted to engage the bushing and valve to operate the latter. Fig. 5 is a sectional view on line $y-y$ of Fig. 2.

In the application of my invention, I employ a bushing A whose exterior surface is threaded so that it may be screwed into the opening in the barrel or cask, and whose outer end may be provided with a flange but is preferably without the same as shown, the said bushing having at its entrance end the inwardly projecting lugs B. Interior to these lugs the bushing is provided with a screw-threaded portion C having an inwardly projecting annular edge or shoulder D at the bottom, upon which is seated an elastic washer E, the inner periphery of which projects inwardly a short distance; the said washer being held in place by means of a ring F externally threaded and adapted to engage the inner threaded portion C of the bushing whereby the washer is firmly held in place with its inner periphery projecting slightly within the ring and shoulder as shown. The ring F has notches or holes, to be engaged by a suitable key for the purpose of seating or removing it. The inner end of the bushing has a smooth exterior and is rounded or beveled and adapted to form a seat for a cap $a$ on the inner end of the valve stem.

On the inside of the inner end of the bushing are formed the spirally disposed lugs or guides G, with stops or walls H at their lower inclined portions adapted to arrest the movement of the lugs upon the valve stem when the valve is open, as hereinafter described, whereby the draw off portion is always maintained in its proper vertical position and prevented from canting out of such a position; the said lugs or guides G having their terminal ends made straight or flat in a plane extending approximately in a circle around the interior of the bushing, so that when the lugs on the valve have reached these points, the valve is not only fully closed but securely locked against accidental displacement.

The cap $a$ upon the end of the valve stem is preferably cup-shaped, and its inner circumference is beveled, so that it will closely fit the corresponding face of the bushing, whereby the rotary movement of the valve in opening and closing will cause the faces to fit evenly and thereby automatically preserve the joint between the two. This cap $a$ fits approximately and forms a continuation of the exterior of the bushing, so as to present a smooth surface over which the melted pitch used in lining the interior of the barrels, will flow without entering. When the cap is forced away from the end of the bushing by the opening of the valve after the pitch has become hard, the pitch will break and leave an opening at the junction of the cap and bushing for the admission of the contents of the cask to the interior of the bushing. The cap allows the casks to be pitched without disturbing or clogging the valve, by closing the cap against the end of the bushing. The cap $a$ is secured upon the end of a stem I, which end may be reduced and cylindrical and threaded to screw into the cap, but is preferably square or rectangular to fit a like opening in the cap, and to be keyed or riveted thereto. The shank or stem is enlarged at I′ and provided with ways or channels K′ for the passage of the liquid when the valve is open and the cap retracted. At the inner end of this enlarged portion and opposite to the cap is the valve L whose diameter is such as to allow it to pass through the inner diameter of the opening or passage through the ring D, and slightly larger than the opening through the packing ring or washer E whereby the valve is adapted to come up squarely against the inner face of the washer to compress it in the direction of its thickness, and make a tight joint when the cap a is closed against the end of the bushing.

Upon the portion of the stem between the cap a and the valve, are the lugs N adapted to engage and ride along the inclined lugs or guides G to open and close the valve. There is a polygonal or other suitably shaped extension O from the center of the valve face, toward the outer end of the bushing, which is adapted to engage a similarly shaped socket in the inner end of the faucet barrel when the latter is introduced into the bushing, said extension having ways or channels K' for the passage of the liquid. The faucet barrel has its inner end made tapering or conical, and has a diameter about equal to the inner diameter of the ring F whereby when the faucet is inserted this conical or tapered end engages the washer E and compresses it circumferentially to form a tight joint between the engaging surfaces before the faucet barrel is rotated to open the valve. This pressure being at right angles to the pressure exerted upon the same washer by the valve, it prevents the fibers of the same packing in one direction and thereby greatly prolongs the life of the washer. The faucet barrel is also provided with oppositely inclined lugs R which are designed to engage the lugs B at the entrance of the bushing to securely lock the faucet in position, and also to retract the same simultaneous with the opening of the valve, and vice versa. By this construction it will be seen that the single washer E forms a seat against which the valve closes, and also forms a tight joint about the faucet barrel to prevent any leakage when the valve is opened.

Having thus described my invention, what I claim as new, and desire to secure by Letters Patent, is—

1. In a tap and faucet, a bushing fixed in the cask having an annular inwardly projecting interior ring or flange, a valve movable through this ring, with a stem having lugs engaging spirals in the interior of the bushing, and an extension from the valve face adapted to be engaged by and turned with the faucet to advance or retract the valve, and an elastic ring seated upon the interior flange or ring of the bushing and having a smaller interior diameter, whereby its projecting side forms the single seat for the valve when closed, and the interior periphery clasps and forms a joint with the faucet barrel.

2. A bushing formed of a single piece and comprising an externally threaded portion by which it is secured to the barrel opening, a rounded or bevel faced inner end provided with interior oppositely disposed spiral lugs, and opposite disposed lugs at the outer end of the bushing, in combination with a cap having a face tapered or beveled to fit the corresponding seat on the inner end of the bushing, a valve stem by which the cap is carried, having lugs engaging the spiral grooves on the interior of the inner end of the bushing, and a valve on the stem adapted to close against a seat in the bushing.

3. The bushing adapted to be secured within the barrel opening having oppositely disposed inclined lugs on the interior of its inner end, and having the exterior of said inner end rounded or beveled, said bushing being internally threaded at a point intermediate of its inner and outer ends with a shoulder at the base of this threaded portion, a screw ring engaging said threads, and an elastic annular seat confined between said ring and shoulder, in combination with a cap having an inner face tapered or beveled to fit the inner end of the bushing, a stem extending into said bushing from the cap and having ways or channels in its exterior, and lugs on said exterior adapted to engage the spiral grooves in the inner end of the bushing, said stem having a valve at its inner end adapted to be seated against the confined elastic valve seat, and said bushing having lugs at its entrance end; and a faucet barrel having oppositely inclined lugs adapted to engage the lugs at the entrance of the bushing, and having its inner end adapted to engage the valve stem to rotate the same, and the exterior of the barrel forming a joint with the inner periphery of the elastic valve seat, substantially as herein described.

4. The bushing adapted to be fitted within the barrel opening and provided with an internal screw-threaded portion with a shoulder at the base of the same, a washer adapted to be seated against said shoulder, a ring to secure the washer in place, a cap having its face beveled and adapted to close against a similar face on the bushing, a stem extending into the bushing from the cap having ways or channels in its exterior and a valve fixed to its inner end opposite to the cap adapted to engage the side face and form a tight joint with the washer of the bushing when the valve is closed, said stem having lugs engaging spiral lugs on the bushing and having a projecting portion from the valve face, a faucet having a barrel whose inner end is conical or tapered and adapted to engage and compress the washer edgewise, and to engage the valve stem, and having spirally disposed lugs to engage lugs at the entrance of the bushing whereby the faucet is locked and operates the valves, substantially as herein described.

In witness whereof I have hereunto set my hand.

GEORGE H. MERRICK.

Witnesses:
JOHN P. POOLE,
S. H. NOURSE.